United States Patent [19]

Hickernell

[11] Patent Number: 4,907,856
[45] Date of Patent: Mar. 13, 1990

[54] ACOUSTOOPTIC TRANSDUCER ARRANGEMENT FOR OPTICAL FIBERS

[75] Inventor: Fred S. Hickernell, Phoenix, Ariz.
[73] Assignee: Motorola, Inc., Schaumburg, Ill.
[21] Appl. No.: 237,936
[22] Filed: Aug. 29, 1988
[51] Int. Cl.$^4$ ............................ G02B 6/02; G02B 6/16
[52] U.S. Cl. ............................... 350/96.29; 350/96.30
[58] Field of Search ............................ 350/96.29, 96.30

[56] References Cited

U.S. PATENT DOCUMENTS 4,068,191  1/1978  Zemon et al. .................... 350/96.13

OTHER PUBLICATIONS

"Acoustooptic Modulators for Single Mode Fibers", *Journal of Lightwave Technology;* vol. LT-5, No. 7; Jul. 1987, pp. 990-992.

*Primary Examiner*—William L. Sikes
*Assistant Examiner*—Robert E. Wise
*Attorney, Agent, or Firm*—Frank J. Bogacz

[57] ABSTRACT

An acoustooptic transducer includes a base and cap which may be mated axially along a certain length of an optical fiber. The base and cap each include a semicircular channel fabricated along one axis. A zinc oxide layer is sandwiched between two metal layers in each of the semicircular channels. When the cap and base are mated, each of the semicircular channels of metal and zinc oxide correspond to form coaxial cylindrical channels of zinc oxide sandwiched by layers of metal surrounding the fiber. Under an applied electrical force, to electrodes of the metal layers, the zinc oxide produces focused acoustic waves for coupling to the light transmitted through the optical fiber. In another embodiment of this invention, the layer of zinc oxide sandwiched between the metal layers may be applied directly to a predetermined length of the optical fiber.

19 Claims, 2 Drawing Sheets

ACOUSTOOPTIC TRANSDUCER ARRANGEMENT FOR OPTICAL FIBERS

STATEMENT OF GOVERNMENT INTEREST

This invention was made with Government support under Contract No. N00014-85-C-2279 awarded by the U.S. Naval Research Laboratory. The Government has certain rights in this invention.

BACKGROUND OF THE INVENTION

The present invention pertains to light transmission via single mode optical fiber and more particularly a transducer arrangement for interacting acoustic waves with light waves traveling in a single mode optic fiber.

The problem of effectively coupling information to an optical fiber and detecting the light transmitted through an optical fiber have long existed. Fiber optic tap connectors which provide this coupling are well-known in the art. Typically, such connectors have an element which pierces the fiber optic cable to deflect a portion of the light transmitted through the cable for detection and coupling to other devices. One such connector is shown in U.S. Pat. No. 4,741,584 issued on May 3, 1988 to E. Segerson and assigned to the same assignee as the present invention. However, piercing or cutting the optical fiber weakens the fiber and may produce a signal loss.

The above-mentioned problems exist for coupling to optical fiber which is already connected in-place between two points. Another arrangement for coupling to an inplace optical fiber includes the attachment of clamshell (glass) capillary halves having an outer transducer bonded about the outer surface of the glass clamshell. In this configuration, two semi-circular halves of a glass rod must be precisely cut longitudinally. Such cutting is difficult and requires expensive tooling. In addition, this glass rod must have a hole cut along the longitudinal axis of the rod cylinder. Again, this hole must be precisely cut. In addition, a cylindrically shaped glass rod is required.

Next, the two halves of the glass rod are coated along their outer circumference with a layer of metal. Next, a layer of zinc oxide (ZnO) is applied over the first layer of metal. Lastly, another layer of metal is applied over the zinc oxide over the entire periphery of the rod.

The layer of zinc oxide acts as a piezoelectric film and when a RF electrical source is applied to the metal layers, the zinc oxide produces acoustic waves. The acoustic waves may be focused through the glass material at the core of the fiber. As a result, the contents of the lights transmitted through the core of the optic fiber may be information modulated or interrogated.

The above arrangement requires that the glass rod be cylindrical in shape to provide precise coupling to the optic fiber core. Shapes of the transducer other than round are inoperable. In addition, the glass halve and longitudinal hole must be cut in the glass with a great deal of precision. These tasks are very difficult to perform and require very expensive equipment.

One such arrangement is shown in an article entitled *Acoustooptic Modulators for Single-Mode Fibers*, published by the Journal of Lightwave Technology, Vol. LT-5, No. 7, July, 1987.

Accordingly, it is an object of the present invention to provide an acoustooptic transducer arrangement for efficiently coupling to an in-place optic fiber which may be easily manufactured and attached to the optic fiber.

SUMMARY OF THE INVENTION

In accomplishing the object of the present invention, a novel acoustooptic transducer arrangement is shown.

An acoustooptic transducer couples acoustic energy to light waves traveling through an optical fiber. The acoustooptic transducer includes a body which comprises two portions. The two body portions each include a channel fashioned along a surface of each portion of the body. Each channel is adapted to precisely circumscribe the optical fiber.

A piezoelectric structure is disposed about the surface of the channels of the first and/or second portions of the body. The piezoelectric structure operates in response to an electrical signal to produce an acoustic wave focused upon the optical fiber. The optical fiber is positioned directly in contact with the piezoelectric structure along the channel, so that the channel circumscribes a predetermined length of the optical fiber.

The first and second portions of the body are positioned so that the optical fiber resides in the channel in contact with the piezoelectric structure. The first and second portions of the body are bonded so that the piezoelectric structure is coaxially oriented about the optical fiber. As a result, the acoustic waves generated by the piezoelectric transducer structure are focused on the transmitted light waves of the optical fiber.

DESCRIPTION OF THE PREFERRED EMBODIMENT

Figure 1:
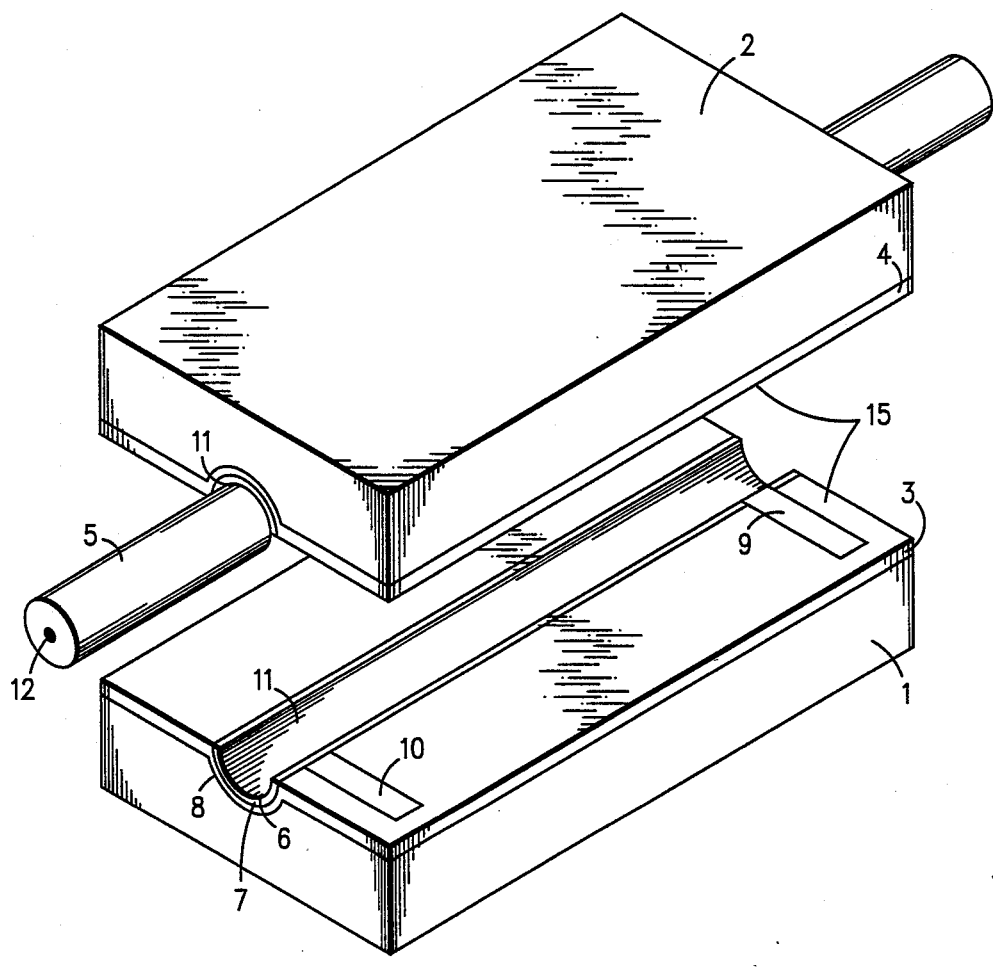
FIG. 1 is an exploded isometric view of an acoustooptic transducer arrangement embodying the principles of operation of the present invention.

Referring to FIG. 1, an isometric view of the present invention is shown. Base 1 and cap 2 are positioned about a length of optical fiber 5. Base 1 and cap 2 form the supporting structure for the acoustooptic transducer embodying the present invention. Base 1 and cap 2 may be made of a plastic, crystalline (i.e. silicon) or glassy (i.e. fused quartz) material.

Base 1 and cap 2 each have a semicircular channel 11 fashioned along one axis. In the case of a plastic base 1 and cap 2, this channel may be obtained by molding. In the case of silicon material, the channel may be made by a photo etching process. In the case of other crystalline and glassy materials, the channel may be made by diamond turning or grinding and polishing. These two channels are constructed so that when base 1 is mated with cap 2, the semicircular channels form one circular channel which circumscribe the optical fiber 5. The base 1 and cap 2 of the transducer body may be fastened together via mechanical or adhesive means.

Base 1 and cap 2 may have corresponding layers 3 and 4 applied across the mating surfaces 15 adjacent to channels 11. Layers 3 and 4 are electrical isolation material in cases where the base and cap materials are conductive.

Figure 2:
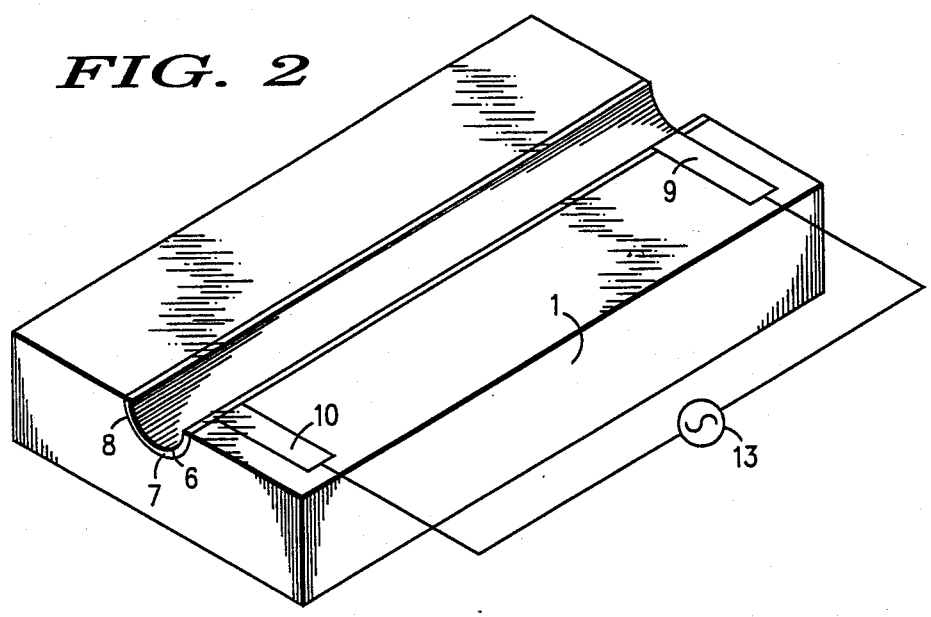
FIG. 2 is a detailed isometric view of the channel portion of the base and cap as shown in FIG. 1.
Figure 3:
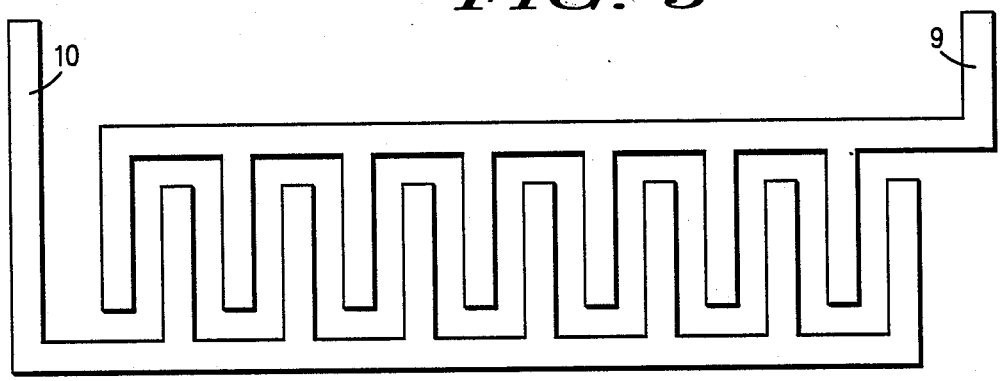
FIG. 3 is a layout of electrodes for the present invention for facilitating optical tapping of an optical fiber.

Next, a layer of metal is applied to each inner channel 11 of base 1 and cap 2. This metal layer may comprise electrical conductors such as aluminum or copper. This metal layer 8 is shown in FIG. 1 and is shown in further detail in FIG. 2. Reference FIG. 2. It may be a continuous metal layer or patterned in a discontinuous or interdigital manner as shown in FIG. 3.

Then a layer of oriented zinc oxide (ZnO) 7 is vacuum deposited in both semicircular channels 11 over metal layer 8 of base 1 and cap 2. Another metal layer 6 is applied to channels 11 of base 1 and ca 2 over zinc oxide layer 7. This layer may comprise an electrical conductor metal and pattern selected from those mentioned above.

Referring again to FIG. 1, electrical connection to metal layer 8 is established by outer electrode 10. Inner electrode 9 is electrically connected to the innermost metal layer 6. A voltage source 13 may be placed across electrodes 9 and 10 to stimulate the oriented piezoelectric zinc oxide film layer 7 as shown in FIG. 2.

By experimentation it was determined that the zinc oxide material orients itself normal (perpendicular) to the shape of the cylindrical surface for the generation of acoustic waves. The zinc oxide forms a bulk acoustic wave (BAW) transducer which is focused to the center core 12 of optical fiber 5.

Optical fiber 5 is placed in direct contact with the BAW transducer, comprising layers 6, 7 and 8, by bonding the base 1 and cap 2 portions together, encircling optical fiber 5 in channels 11. The bonding of cap 2 and base 1 may be accomplished by permanent or nonpermanent adhesive bonding material or by a mechanical arrangement such as a clamp.

The acoustic waves generated by the piezoelectric zinc oxide layer 7 are focused on the core 12 of optical fiber 5. As a result, an index change or periodic variation is generated when an electrical signal is transmitted to electrodes 9 and 10. This index change causes the phase velocity of an optical wave transmitted through the core 12 of optical fiber 5 to change. In addition, the optical wave traveling through core 12 of optical fiber 5 may be diffracted in accordance with Bragg diffraction techniques a result of the bulk acoustic wave generated at an angle with respect to the fiber core by this transducer.

When base 1 and cap 2 are mated, each of the layers are aligned so that layers 6, 7 and 8 of base 1 are coaxially aligned with to layers 6, 7 and 8 of cap 2 over he entire length of channels 11.

In the present invention, the zinc oxide layer 7 is proximate to optic fiber 5, the asoustic wave created by zinc oxide layer 7 may easily, efficiently and readily be focused upon the core 12 of optical fiber 5. As the frequency of the voltage applied across electrodes 9 and 10 changes between 200 MHz and 1 GHz, the zinc oxide film 7 produces traveling and standing acoustic waves at particular intervals of the frequency. The velocity of the light may be significantly changed at the various frequencies between 200 MHz and 1 GHz.

The teachings of *Acoustooptic Modulators for Single-Mode Fibers,* Journal of Lightwave Technology, Vol. LT-5, No. 7, July, 1987 by H. F. Taylor, and *Switchable Fiber-Optic Tap Using Acoustic Transducers Deposited Upon the Fiber Surface,* Optics Letters, Vol. 12, March 1987, p. 208 by the Optical Society of America, B. L. Heffner and G. S. Kino are hereby incorporated by reference.

Since the transducer (two metal layers sandwiching the zinc oxide layer) is in direct contact with the optical fiber, a more efficient focus is obtained. The glass capillary previously shown in the art is no longer necessary. This makes for ease in manufacturing of the transducer device, since the shape now may comprise any outer shape having a cylindrical channel. The geometry of the present invention eliminates losses due to the propagation path through the glass medium. In addition, the present invention permits a direct application of an efficient thin-line acoustic bond between the transducer and the optic fiber 5. For bonding the cap 2 and base 1 of the transducer together, a nonpermanent, high viscosity grease or resin bonding could be used. This allows the transducer to be clamped on and removed easily.

Applications for the transducer described above include, but are not limited to, a fiber phase modulator, a fiber phase frequency shifter, a tap connector for optical fiber and a polarization coupler.

In another embodiment of the present invention, metal layers 6 and 8 and zinc oxide layer 7 as shown in FIG. 2 may be applied directly to optical fiber 5. Metal layer 6 would first be applied to the optical fiber 5 for a predetermined length to which an electrically isolated electrode 9 can make contact. Next, the piezoelectric zinc oxide layer 7 would be vacuum deposited over the layer of metal 6 for the same predetermined length of the fiber 5. Lastly, another metal layer 8 would be applied over the zinc oxide layer 7. Metal layer 8 can be contacted by an electrically isolated electrode 10.

When a 50 ohm signal source such as source 13 of FIG. 2 is applied to electrodes 9 and 10, the zinc oxide layer 7 produces the acoustic waves focused at the core 12 of optical fiber 5 as described above. In this embodiment of the invention, no base 1 or cap 2 is required. In this arrangement, the transducer is made a part of the optical fiber. This is a more permanent arrangement than that described above for the clamp-on type acoustooptic transducer.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An acoustooptic transducer for acoustooptic coupling to light waves traveling through an optical fiber, said acoustooptic transducer arrangement comprising:

body means including first and second portions, each of said first and second portion of said body means including channel means located axially along a surface of each portion and said channel means adapted to circumscribe said optical fiber;

piezoelectric means disposed about the surface of said channel means of said first and second portions of said body means, said piezoelectric means operating in response to an electric signal to produce an acoustic wave focused upon said optical fiber;

said optical fiber being positioned directly in contact with said piezoelectric means so that a channel means circumscribes a predetermined length of optical fiber; and said first and second portions of said body means being positioned about said optical fiber so that said optical fiber is in direct contact with said piezoelectric means of said channel means, said first and second portions being bonded so that said piezoelectric means is coaxially oriented along said predetermined length of said optical fiber, whereby said acoustic waves are focused on said transmitted light waves of said optical fiber.

2. An acoustooptic transducer as claimed in claim 1, said channel means of said first and second portions of said body means each including semicircular cavities along said surface of said first and second portions of said body means.

3. An acoustooptic transducer as claimed in claim 2, wherein said first and second portions of said body means are substantially rectangular in shape.

4. An acoustooptic transducer as claimed in claim 2, wherein said first and second portions of said body means are substantially cylindrical in shape.

5. An acoustooptic transducer as claimed in claim 2, wherein said first and second portions of said body means are fabricated substantially of silicon.

6. An acoustooptic transducer as claimed in claim 2, wherein first and second portions of said body means are fabricated substantially of fused quartz.

7. An acoustooptic transducer as claimed in claim 2, wherein said first and second portions of said body means are fabricated substantially of plastic.

8. An acoustooptic transducer as claimed in claim 2, said piezoelectric means including:
   first conductive layer means disposed along a surface of said semicircular cavities;
   piezoelectric layer means being deposited over said first conductive layer means along said surface of said semicircular cavities; and
   second conductive layers means deposited over said piezoelectric layer means along said surface of said semicircular cavities.

9. An acoustooptic transducer as claimed in claim 8, wherein said first and second conductive layer means each includes a corresponding first and second electrode means, said first electrode means being connected to said first conductive layer means and said second electrode means being connected to said second conductive layer means, said first and second electrode means being electrically isolated from one another.

10. An acoustooptic transducer as claimed in claim 8, wherein said first and second conductive layer means are comprised of metal means.

11. An acoustooptic transducer as claimed in claim 10, wherein said metal means comprises aluminum.

12. An acoustooptic transducer as claimed in claim 10, wherein said metal means comprises copper.

13. An acoustooptic transducer as claimed in claim 8, wherein said piezoelectric layer means comprises zinc oxide (ZnO).

14. An acoustooptic transducer as claimed in claim 8, wherein there is further included an electric source connected to said first and second electrode means, said electric source supplying a voltage to said piezoelectric layer means for the production of said acoustic waves.

15. An acoustooptic transducer as claimed in claim 8, wherein said first and second electrode means includes digit means being interdigitally aligned, so that said digit means of said first electrode means are alternately interleaved with said digit means of said second electrode means.

16. A method for fabricating an acoustooptic transducer, said acoustooptic transducer including first and second portions of a body for placing said transducer in contact with an optical fiber, said first and second portions of said body each including a corresponding semicircular channel for circumscribing said optical fiber, said method for fabrication of an acoustooptic transducer comprising the steps of:
   depositing a first conductive layer about said semicircular channels of said first and second portions of said body;
   second depositing a piezoelectric layer over said first conductive layer along said semicircular channel of said first and second portions of said body; and
   third depositing a second conductive layer over said piezoelectric layer along said semicircular channel of said first and second portions of said body.

17. A method for fabrication of an acoustooptic transducer as claimed in claim 16, wherein there is further included the steps of:
   first attaching a first electrode to said first conductive layer;
   second attaching a second electrode to said second conductive layer; and
   isolating said first and said second electrically from one another.

18. A method for fabrication of an acoustooptic transducer as claimed in claim 17 wherein there is further included the step of attaching said first and second portions of said body about an optical fiber so that said semicircular channels with said deposited layers circumscribe said optical fiber.

19. A method for fabrication of an acoustooptic transducer as claimed in claim 18, wherein there is further included the step of exciting said piezoelectric layer by application of an electrical source to said first and second conductive layers via said first and second electrodes.

* * * * *